United States Patent [19]

Cutler et al.

[11] Patent Number: 4,592,768
[45] Date of Patent: Jun. 3, 1986

[54] APPARATUS AND PROCESS FOR DESALINATION COMBINING FREEZE CONCENTRATION, CENTRIFUGATION, AND REVERSE OSMOSIS

[75] Inventors: Donald R. Cutler, Bolingbrook, Ill.; Alan R. Blankshain, Murray, Utah

[73] Assignee: Chicago Bridge & Iron Company, Oak Brook, Ill.

[21] Appl. No.: 543,760

[22] Filed: Oct. 20, 1983

[51] Int. Cl.$^4$ .............................................. B01D 9/04
[52] U.S. Cl. ................... 62/532; 23/295 R; 210/652; 210/774; 210/259; 210/295
[58] Field of Search ............. 62/532, 536, 544; 23/296, 295 R; 210/652, 774, 321.1, 433.2, 259, 651, 295

[56] References Cited

U.S. PATENT DOCUMENTS 4,099,947  6/1978  Ganiaris ................................ 62/532
4,316,368  2/1982  Pelt et al. ............................. 62/544

*Primary Examiner*—Frank Sever
*Attorney, Agent, or Firm*—Marshall, O'Toole, Gerstein, Murray & Bicknell

[57] ABSTRACT

Apparatus comprising a freeze exchanger in which an aqueous mixture is indirectly cooled by a cooling fluid to produce an aqueous mixture containing ice; a centrifuge; a conduit for feeding an ice slurry from the freeze exchanger to the centrifuge; a heater; a conduit for feeding ice from the centrifuge to the heater to melt the ice; a water treatment apparatus; a conduit for feeding the water from the heater to the water treatment apparatus to condition the water for contact with a reverse osmosis membrane; a reverse osmosis apparatus; and a conduit for feeding the conditioned water to the reverse osmosis apparatus in which the water is purified by reverse osmosis. A method comprising feeding an aqueous mixture into indirect heat exchange with a cooling fluid to produce ice particles in the aqueous mixture and thus to form an ice slurry; centrifuging the ice slurry to separate the ice and form an aqueous effluent; melting the separated ice and treating the resulting water to remove components which damage a reverse osmosis membrane; and subjecting the treated water to reverse osmosis using a reverse osmosis membrane to produce potable water and an impure water stream.

8 Claims, 1 Drawing Figure

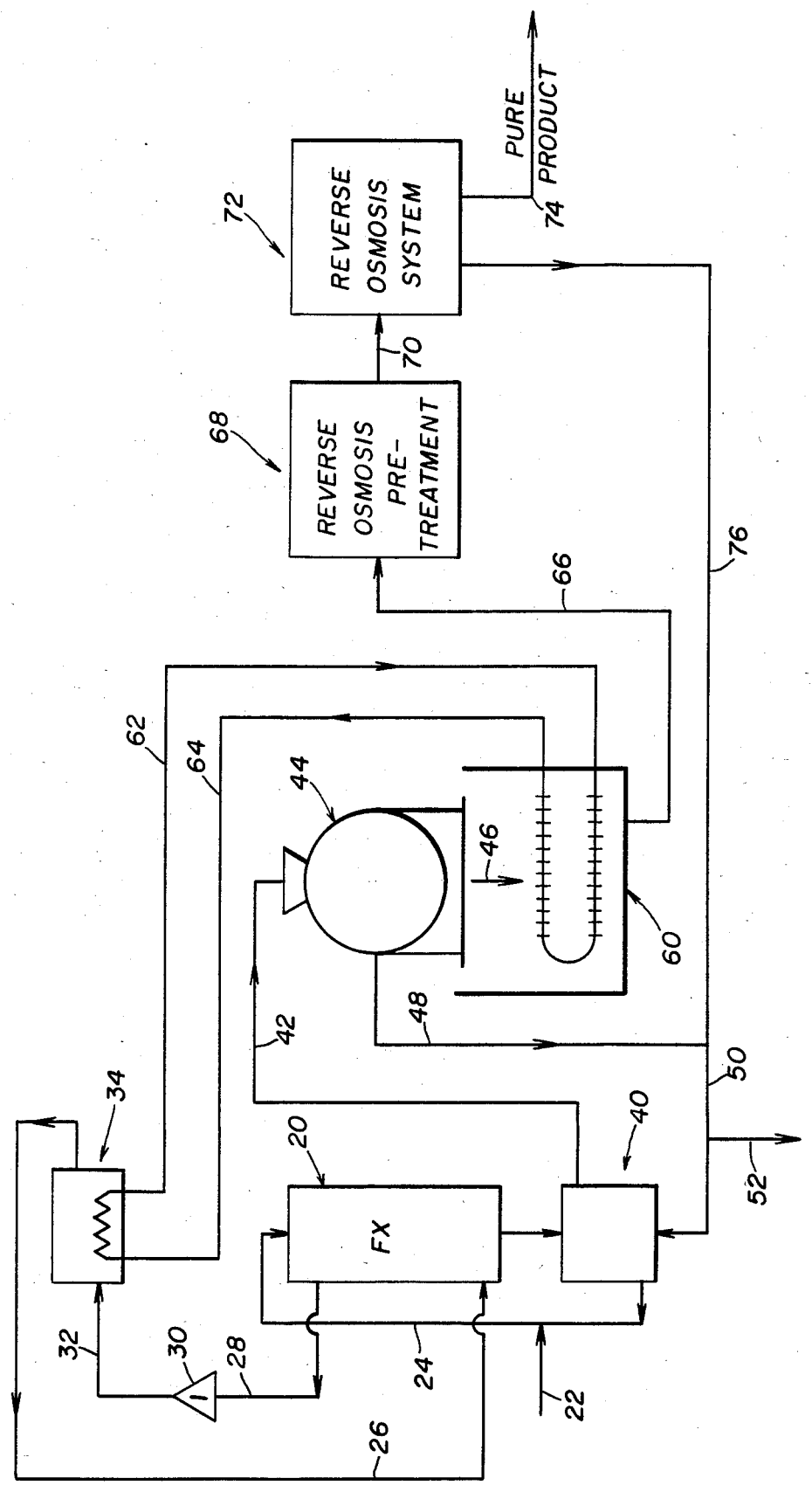

APPARATUS AND PROCESS FOR DESALINATION COMBINING FREEZE CONCENTRATION, CENTRIFUGATION, AND REVERSE OSMOSIS

This invention relates to apparatus and methods of producing potable water from sea water or brackish water. More particularly, this invention is concerned with the production of potable water by desalination using a novel combination of freeze exchanger, centrifuge, water treatment system and reverse osmosis apparatus.

BACKGROUND OF THE INVENTION

It has been known for many years that potable water could be produced from sea water or brackish water by cooling it to produce ice, separating the ice and then washing and melting the ice. When the ice forms it excludes minerals so that upon being melted water is obtained of potable quality.

Various types of freeze exchangers useful for producing ice from sea water or brackish water are disclosed in the prior art. Thus, shell and tube type falling film freeze exchangers are disclosed in Engdahl et al U.S. Pat. No. 4,286,436 and Nail U.S. Pat. No. 4,335,581. A desirable characteristic of such freeze exchangers is their ability to handle a wide quality of feeds without pretreatment.

The freeze exchanger produces an aqueous mixture comprising small ice particles and sea water or brackish water, quite often referred to as brine. A slurry of the ice and brine is generally fed from the freeze exchanger to a counterwasher in which the ice is washed free of brine. A representative counterwasher is disclosed in Nail U.S. Pat. No. 4,341,085. While counterwashers produce a clean highly pure ice, they are difficult to operate and control.

Although the mixture of ice and brine from the freeze exchanger could be fed to a conventional centrifuge instead of a counterwahser, the ice obtained from centrifugation would not be sufficiently free of brine to yield potable water when melted. Thus, the simple convenience of a centrifuge does not lead to the desired result.

From the above discussion it is believed clear that it would be highly advantageous to have available apparatus and processes for producing potable water from sea water or brackish water which make use of the inherent advantages of freeze exchangers and centrifuges.

SUMMARY OF THE INVENTION

According to one aspect of the invention apparatus is provided comprising a freeze exchanger in which an aqueous mixture is indirectly cooled by heat exchange with a cooling fluid to produce an aqueous mixture containing ice; a centrifuge; conduit means for feeding an ice slurry from the freeze exchanger to the centrifuge to separate ice from the water; a heater; conduit means for feeding the ice from the centrifuge to the heater to melt the ice; a water treatment apparatus; conduit means for feeding the water from the heater to the water treatment apparatus to condition the water for contact with a reverse osmosis membrane; a reverse osmosis apparatus; and conduit means for feeding the conditioned water from the treatment apparatus to the reverse osmosis apparatus in which the water is purified by reverse osmosis.

The apparatus can include a conduit means for returning water effluent from the centrifuge to the freeze exchanger. In addition, the apparatus can include a conduit means for returning impure water from the reverse osmosis apparatus to the freeze exchanger.

The cooling fluid used to cool the aqueous mixture in the freeze exchanger can be a refrigerant in a refrigeration closed loop which includes a condenser which is water cooled by cold water from the heater. Hot water formed in the condenser can be recycled to the heater to melt ice therein. This system efficiently conserves energy by combining a required heat exchange step from the refrigeration system with the melting of the ice. This heat exchange is carefully controlled to produce the optimum liquid temperature for later processing in the reverse osmosis step.

According to a second aspect of the invention, a method is provided comprising feeding an aqueous mixture into indirect heat exchange with a cooling fluid to produce ice particles in the aqueous mixture and thus to form an ice slurry; centrifuging the ice slurry to separate the ice and form an aqueous effluent; melting the separated ice and treating the resulting water to remove components which damage a reverse osmosis membrane; and subjecting the treated water to reverse osmosis using a reverse osmosis membrane.

BRIEF DESCRIPTION OF THE DRAWING

The attached drawing is a schematic representation of apparatus provided by the invention for producing pure water.

DETAILED DESCRIPTION OF THE DRAWING

The subsequent detailed description of the drawing will be directed to use of the apparatus in producing potable water from sea water or brackish water.

With reference to the drawing, freeze exchanger 20 can be of the falling film shell and tube type disclosed in Engdahl et al U.S. Pat. No. 4,286,436 and Nail U.S. Pat. No. 4,335,581. Sea water containing 3 to 3.5% salt is fed by conduits 22 and 24 to the top tube side of the freeze exchanger 20. As the falling film of sea water flows down the inside of the tubes it is cooled by heat transfer to a cooling fluid on the shell side of the freeze exchanger 20. The cooling fluid can be a refrigerant, such as ammonia, introduced as a liquid into the freeze exchanger 20 lower portion by conduit 26. Refrigerant vapor is withdrawn from the freeze exchanger by conduit 28 and fed to compressor 30. The refrigerant is fed by conduit 32 from compressor 30 to condenser 34 in which the refrigerant is cooled by heat exchange to cold water. The liquefied refrigerant is withdrawn from condenser 34 through conduit 26 and returned to the lower portion of the freeze exchanger 20.

Cooling of the sea water as it flows through freeze exchanger 20 results in the formation of small ice crystals. The mixture of ice crystals and sea water flows out the bottom of the freeze exchanger 20 into receiver 40. The ice floats to the top in receiver 40. The sea water or brine is removed from the bottom of the receiver 40 by conduit 24 and returned to the top of freeze exchanger 20 to produce more ice.

A mixture of ice and sea water is withdrawn from receiver 40 through conduit 42 and fed to the inlet of centrifuge 44. The mixture fed to the centrifuge contains about 10% by weight of ice.

The product stream from centrifuge 44 is removed by conduit 46 and fed to heater 60. The stream fed to the heater is nearly 100% by weight ice. The effluent or brine is withdrawn from centrifuge 44 through conduit 48 which feeds it to conduit 50 for return to receiver 40. Simultaneously or periodically, some brine is withdrawn from conduit 50 through conduit outlet 52 and fed to waste.

Hot water, or some other suitable liquid, is withdrawn from condenser 34 through conduit 62 and fed into heater 60 where it indirectly melts the ice in the heater and itself is converted to cold water. The cold water is withdrawn from heater 60 by means of conduit 64 and fed to condenser 34 to cool and condense the refrigerant. The described system makes effective use of the condenser heat to melt ice and produce cold water to condense the refrigerant. It also warms the product water. This is desirable because many reverse osmosis membranes perform best when the water is at about 40° to 90° F.

The water produced in the heater 60 by melting the ice will contain about 5000 ppm of salt so it must be further purified before it can be considered potable water which has 500 ppm or less of salt. The water, accordingly, is subsequently subjected to a reverse osmosis purification to increase its purity to a level characteristic of potable water. However, before the water obtained from the melted ice can be purified by reverse osmosis, the water must be treated to eliminate materials such as calcium, iron and chloride ions, as well as undissolved solids, from the water since such substances interfere with acceptable operation of reverse osmosis membranes. This treatment is much less than normal due to the large salinity reduction already accomplished by the freeze concentration stage. This results in substantial savings compared to using reverse osmosis alone.

The water, produced in heater 60 by melting ice therein, is withdrawn by conduit 66 and fed to water pretreatment unit 68 of conventional design and operation. Ion exchange resins can be used for the pretreatment as well as known chemical procedures.

The water treatment stage can be based on manufacturers' recommendations when water is to be fed to a reverse osmosis membrane. The water treatment stage may, for example, include the steps of removing any residual suspended solids, elimination of any dissolved chlorine gas and removal of iron and calcium ions. All these should be removed to protect the membrane from damage or fouling.

After the water has been treated as described it is fed at a temperature of 40° to 90° F. and a pressure of about 3 to 40 atmospheres by conduit 70 to a reverse osmosis system 72 in which the water flows through a membrane made of a flexible polymeric material, such as cellulose acetate. The water molecules readily pass through the membrane while the membrane rejects passage of impurities and mineral ions. The pure or potable water containing less than 400 ppm of salt is withdrawn from the reverse osmosis system by conduit 74 for use as desired. The brine or reject water from the system containing about 9000 ppm of salt is withdrawn through conduit 76 and, if desired, fed to conduit 50 for reuse in the system.

The foregoing detailed description has been given for clearness of understanding only, and no unnecessary limitations should be understood therefrom, as modifications will be obvious to those skilled in the art.

What is claimed is:

1. Apparatus comprising means designed for producing potable water from brine by converting brine to ice containing residual brine adhering to the ice and removing the brine from the ice to yield potable water when melted, the means comprising:
    a freeze exchanger in which brine is indirectly cooled by heat exchange with a cooling fluid to produce brine containing ice;
    a centrifuge;
    conduit means for feeding an ice slurry from the freeze exchanger to the centrifuge to separate ice from the brine;
    a heater;
    conduit means for feeding the ice from the centrifuge to the heater to melt the ice;
    a water treatment apparatus;
    conduit means for feeding the water from the heater to the water treatment apparatus to condition the water for contact with a reverse osmosis membrane;
    a reverse osmosis apparatus; and
    conduit means for feeding the conditioned water from the treatment apparatus to the reverse osmosis apparatus in which the water is purified by reverse osmosis.

2. Apparatus according to claim 1 including a conduit means for returning brine effluent from the centrifuge to the freeze exchanger.

3. Apparatus according to claim 2 including a conduit means for returning impure water from the reverse osmosis apparatus to the freeze exchanger.

4. Apparatus according to claim 1 including a refrigeration closed loop containing the cooling fluid used in the freeze exchanger; the cooling fluid is a refrigerant; the refrigeration closed loop includes a refrigerant water cooled condenser; conduit means for feeding warm water from the condenser to the heater to indirectly melt ice in the heater; and conduit means for feeding cold water from the heater to the condenser to indirectly cool and condense refrigerant therein.

5. A method comprising producing potable water from brine by converting brine to ice containing residual brine adhering to the ice and removing the brine from the ice to yield potable water when melted, including:
    feeding brine into indirect heat exchange with a cooling fluid to produce ice particles in the brine and thus to form an ice slurry;
    centrifuging the ice slurry to separate the ice and brine;
    melting the separated ice and treating the resulting water to remove components which damage a reverse osmosis membrane; and
    subjecting the treated water to reverse osmosis using a reverse osmosis membrane to produce potable water and an impure water stream.

6. A method according to claim 5 including recycling the brine from the centrifuging to the freeze exchanger.

7. A method according to claim 5 including recycling the impure water stream from the reverse osmosis step to the freeze exchanger.

8. A method according to claim 5 in which:
    the cooling fluid is a refrigerant in a refrigeration closed loop which includes a water cooled condenser for condensing the refrigerant;
    the separated ice is melted indirectly in a water heated heater;
    cold water from the heater is fed to the condenser to condense the refrigerant; and
    warm water from the condenser is fed to the heater to melt the ice.

* * * * *